US007356644B2

(12) United States Patent
Bruning, III et al.

(10) Patent No.: US 7,356,644 B2
(45) Date of Patent: Apr. 8, 2008

(54) APPARATUS AND METHOD FOR PROVIDING VERY LARGE VIRTUAL STORAGE VOLUMES USING REDUNDANT ARRAYS OF DISKS

(75) Inventors: Theodore E. Bruning, III, Colorado Springs, CO (US); Randal S. Marks, Colorado Springs, CO (US); Julia A. Hodges, Colorado Springs, CO (US); Gerald L. Golden, Colorado Springs, CO (US); Ryan J. Johnson, Colorado Springs, CO (US); Bert Martens, Monument, CO (US); Karen E. Workman, Elbert, CO (US); Susan G. Elkington, Colorado Springs, CO (US); Richard F. Lary, Colorado Springs, CO (US); Jesse Yandell, Colorado Springs, CO (US); Stephen Sicola, Monument, CO (US); Roger Oakey, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/315,606

(22) Filed: Dec. 22, 2005

(65) Prior Publication Data
US 2006/0101205 A1   May 11, 2006

Related U.S. Application Data

(63) Continuation of application No. 09/286,160, filed on Apr. 5, 1999, now Pat. No. 7,000,069.

(51) Int. Cl.
*G06F 12/00* (2006.01)
(52) U.S. Cl. .................. 711/114; 711/112; 711/113; 714/6; 714/7; 714/100

(58) Field of Classification Search .............. 711/114, 711/112, 113; 714/6, 7, 100
See application file for complete search history.

(56) References Cited

U.S. PATENT DOCUMENTS
2002/0035666 A1*  3/2002  Beardsley et al. .......... 711/114

OTHER PUBLICATIONS
Massiglia, The Raid Book, Feb. 1997, pp. 151-154.*

* cited by examiner

*Primary Examiner*—Kimberly Mclean

(57) ABSTRACT

A very large virtual volume (e.g., in excess of 500 GB) is formed by distributing the disks in eleven, six-disk RAID-5 sets across the six busses of a primary local back-end controller. A spare disk is provided on each of the six busses. Each RAID-5 set is protected from the failure of a single disk by the spare disks on the busses, which can use the parity data stored in a RAID-5 set to rebuild the data stored on a failing disk and thereby restore redundancy to the RAID-5 set. Each RAID-5 set is also protected from the failure of a bus by the parity inherent in RAID-5. The RAID-5 sets are striped by a front-end controller connected to the primary local back-end controller, and the striped RAID-5 sets are presented to a host computer as a very large virtual volume. If the individual disks are 9.1 GB in size, the size of the very large virtual volume can reach 500.5 GB. If desired, additional groups of eleven, six-disk RAID-5 sets can be formed on additional back-end controllers for purposes of redundancy, cloning (which generates a copy of the data that can be used for off-line backup without interrupting read/write activities on the virtual volume), and disaster tolerance through remote storage. These additional groups of RAID-5 sets along with the RAID-5 sets from the primary local back-end controller, can be formed into mirror sets by the front-end controller, which then stripes the mirror sets and presents the striped mirror sets to the host computer as the very large virtual volume.

16 Claims, 3 Drawing Sheets

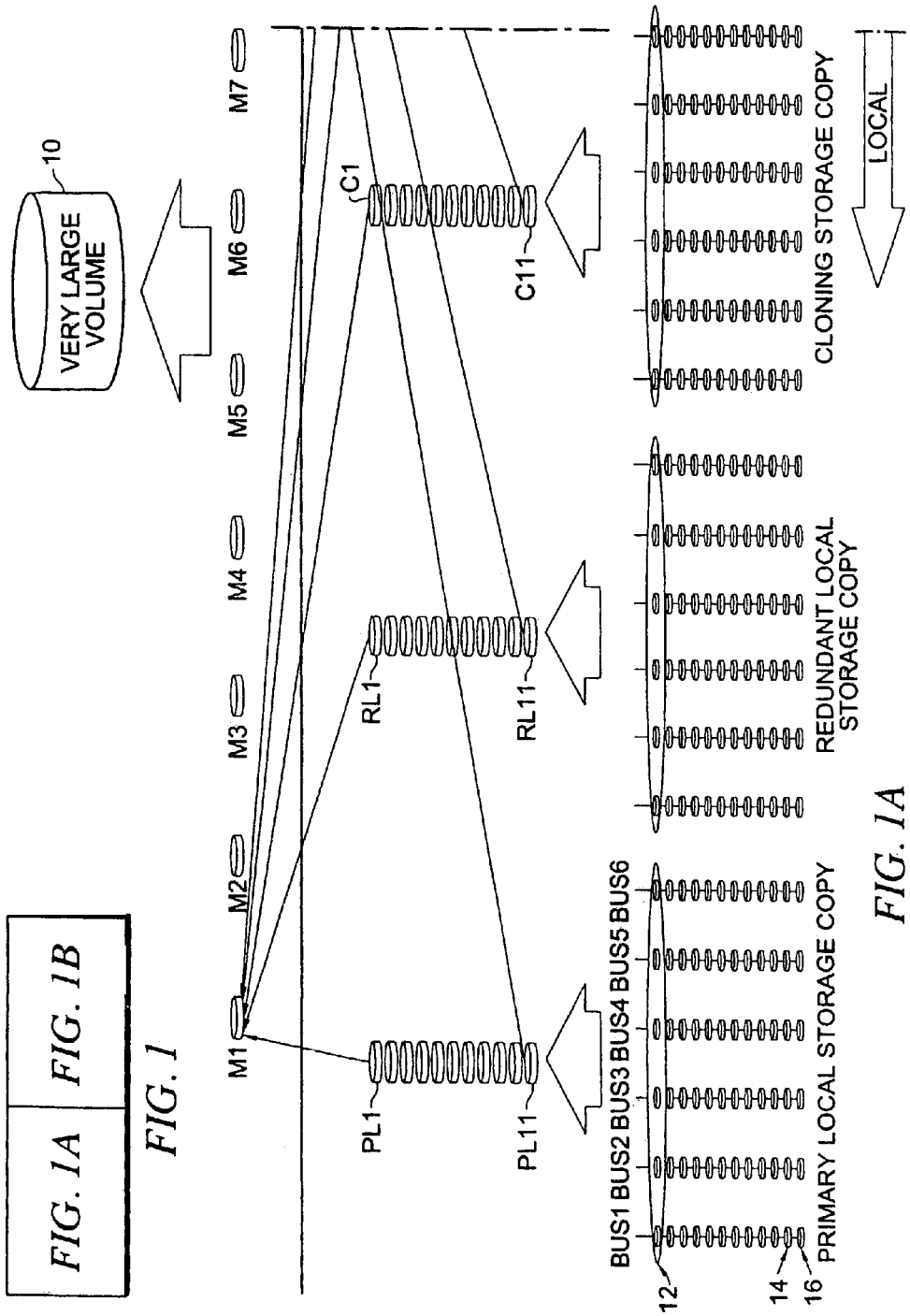

APPARATUS AND METHOD FOR PROVIDING VERY LARGE VIRTUAL STORAGE VOLUMES USING REDUNDANT ARRAYS OF DISKS

RELATED PATENT APPLICATION(S)

This U.S. Nonprovisional Patent Application is a Continuation Patent Application of U.S. Pat. No. 7,000,069 Ser. No. 09/286,160, filed on Apr. 5, 1999, and entitled "APPARATUS AND METHOD FOR PROVIDING VERY LARGE VIRTUAL STORAGE VOLUMES USING REDUNDANT ARRAYS OF DISKS".

TECHNICAL FIELD OF THE INVENTION

This invention relates in general to redundant arrays of disks, such as RAID (Redundant Array of Independent Disks) sets. More specifically, the invention relates to an apparatus and method for providing virtual storage volumes, particularly very large virtual storage volumes (e.g., 100 Gigabytes (GB) or more), using redundant arrays of disks, such as RAID sets.

BACKGROUND OF THE INVENTION

Some computer software applications are organized according to what is referred to as a "single volume architecture," meaning that they store data in a single data file that resides on a single volume. This "volume" may be a physical volume, such as a disk drive, or it may be a virtual volume, such as a RAID set. The Exchange® e-mail program provided by Microsoft Corporation of Redmond, Wash. is an example of such a single-volume-architecture application.

In some cases, the single volume architecture of a particular software application can be problematic because the size of the data file the application needs to store on a single volume exceeds the capacity of the volume. For example, implementations of Microsoft's Exchange® e-mail program in large organizations having many e-mail users can require a single-volume storage capacity exceeding 100 GB, which is greater than many conventional volumes, physical or virtual, can provide. Although it is possible to solve this problem by changing a single-volume-architecture application into a multi-volume-architecture application so that it saves data in multiple files spread across multiple volumes, such efforts can be prohibitively time-consuming and expensive.

Accordingly, there is a need in the art for a very large virtual storage volume having the storage capacity necessary to meet the needs of a single-volume-architecture software application such as Microsoft's Exchange® e-mail program. Preferably, such a storage volume should have built-in disaster tolerance capabilities through the use of remote mirroring or other techniques in order to ensure the integrity of its stored data. In addition, such a storage volume should preferably have cloning capabilities so that data backup can occur off-line without interrupting read/write access to the data.

SUMMARY OF THE INVENTION

An inventive apparatus for providing a very large storage volume includes a plurality of disks and a local back-end controller that organizes and presents the disks as redundant arrays of disks (e.g., RAID-5 sets). Also, a local front-end controller stripes the redundant arrays of disks and presents the striped arrays as a very large storage volume.

To provide local redundancy, another plurality of disks and an associated back-end controller can be provided, in which case the local front-end controller forms mirror sets from the redundant arrays of disks presented by both back-end controllers. In addition, a further plurality of disks and an associated back-end controller can be provided to enable off-line backup of the data stored on the volume by cloning the data onto the disks, and then using the disks as the data source for off-line backup. Also, a still further plurality of disks and an associated back-end controller can be provided at a remote location to protect against disasters occurring at the primary location (commonly referred to as "disaster tolerance"). The disks and back-end controllers providing cloning capabilities and disaster tolerance can be incorporated into the mirror sets formed by the local front-end controller. Further, spare disks can be provided on any or all of the back-end controllers to allow restoration of redundancy after the loss of any particular disk.

If for example, the disks each have 9.1 GB of storage capacity and the local back-end controller organizes the disks into eleven, six-member RAID-5 sets, then the very large storage volume has a storage capacity in excess of 500 GB, which should be adequate for most single-volume architecture programs. In addition, the redundancy restoration capabilities provided by the spare disks, the parity associated with RAID-5 sets, and the mirroring ensures the integrity of the data stored on the very large storage volume.

In another embodiment of this invention, the apparatus described above can be incorporated into an electronic system that also includes a host computer.

In a further embodiment of this invention, data is stored on a plurality of disks by organizing the disks into a plurality of redundant arrays of disks. The redundant arrays of disks are striped together to form a virtual volume, and the data is then written to the virtual volume.

In still another embodiment of this invention, data is again stored on a plurality of disks by organizing the disks into a plurality of redundant arrays of disks. Mirror sets are formed from the redundant arrays of disks, and these mirror sets are then striped together to form a virtual volume. The data is then written to the virtual volume.

BRIEF DESCRIPTION OF THE FIGURES

FIGS. 1A and 1B is a diagram illustrating the organization of a very large volume constructed in accordance with this invention.

DETAILED DESCRIPTION OF THE ILLUSTRATED EMBODIMENTS

Figure 1B:
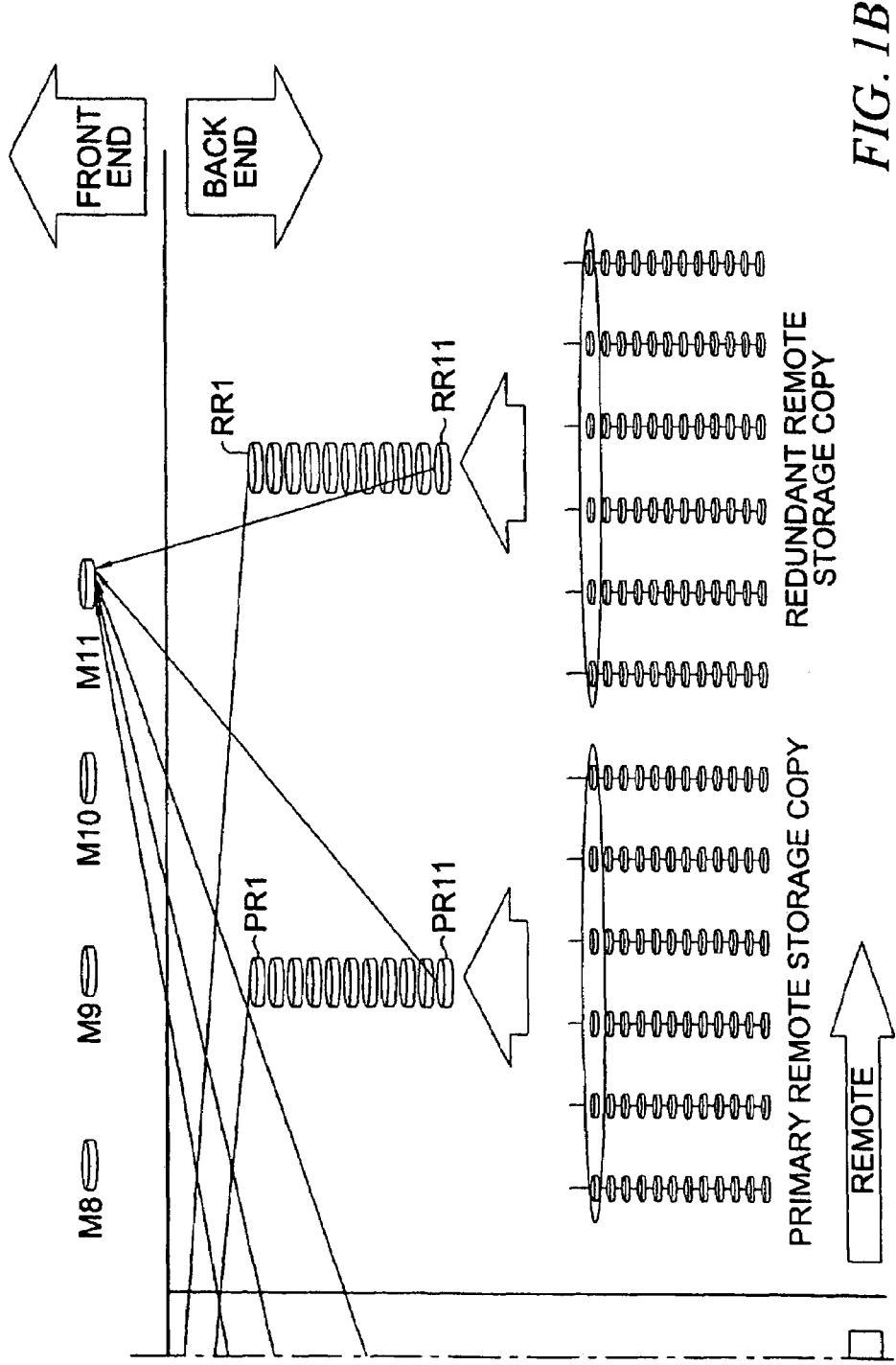

As shown in FIGS. 1A and 1B, a 500.5 GB very large volume 10 constructed in accordance with this invention is organized so as to comprise a RAID-0 stripe set having eleven, 45.5 GB RAID-1 mirror sets M1-M11 as members. Of course, it will be understood by those having skill in the technical field of this invention that although the invention will be described with respect to a very large volume having a 500.5 GB storage capacity, the invention is not limited to any particular storage capacity. In addition, it will be understood that the invention is not limited to the use of any particular redundant array technology (e.g., RAID) and, consequently, is not limited to the use of any particular RAID levels (e.g., RAID-0, RAID-1). Also, it will be understood that the invention may include more or less than the eleven mirror sets M1-M11, and that the individual mirror sets M1-M11 may be larger or smaller in size than the 45.5 GB described here.

As used herein, a "RAID-0 stripe set" will be understood to refer to a virtual volume comprised of two or more member disks or volumes across which "stripes" of data are stored. Also, as used herein, a "RAID-1 mirror set" will be understood to refer to a virtual volume comprised of two or more member disks or volumes, each of which contains an identical copy of the data stored in the mirror set.

The mirror set M1, for example, comprises five, 45.5 GB RAID-5 sets PL1. RL1, C1, PR1, and RR1 as members. Similarly, the mirror set M11 comprises five, 45.5 GB RAID-5 sets PL11, RL11, C11, PR11, and RR11 as members. For purposes of clarity, the RAID-5 set members of the mirror sets M2-M10 are illustrated but not labeled.

Of course, it will be understood that the members of the mirror sets M1-M11 can be other than RAID-5 sets (e.g., RAID-3 or RAID-4 sets). Also, as used herein, a "RAID-5 set" will be understood to refer to a virtual volume comprised of three or more independently accessible member disks or volumes having redundancy protection through parity information distributed across its members.

The RAID-5 sets PL1-PL11 comprise the primary local storage copy of the data stored in the very large volume 10, which means that they are the primary location to which the data is written and from which the data is read. Also, the RAID-5 sets RL1-RL11 comprise a redundant local storage copy of the data, which provides mirroring-type redundancy for the stored data. In addition, the RAID-5 sets C1-C11 comprise a cloning storage copy of the data, which is convenient for use in performing off-line data backups without interrupting read/write activities to the very large volume 10. Disaster tolerance is provided by the RAID-5 sets PR1-PR11, which comprise a primary remote storage copy, and the RAID-5 sets RR1-RR11, which comprise a redundant remote storage copy. Of course, it should be understood that embodiments of this invention may exclude the redundancy provided by the RAID-5 sets RL1-RL11, the cloning capability provided by the RAID-5 sets C1-C11, or the disaster tolerance provided by the RAID-5 sets PR1-PR11 and RR1-RR11.

Figure 2:
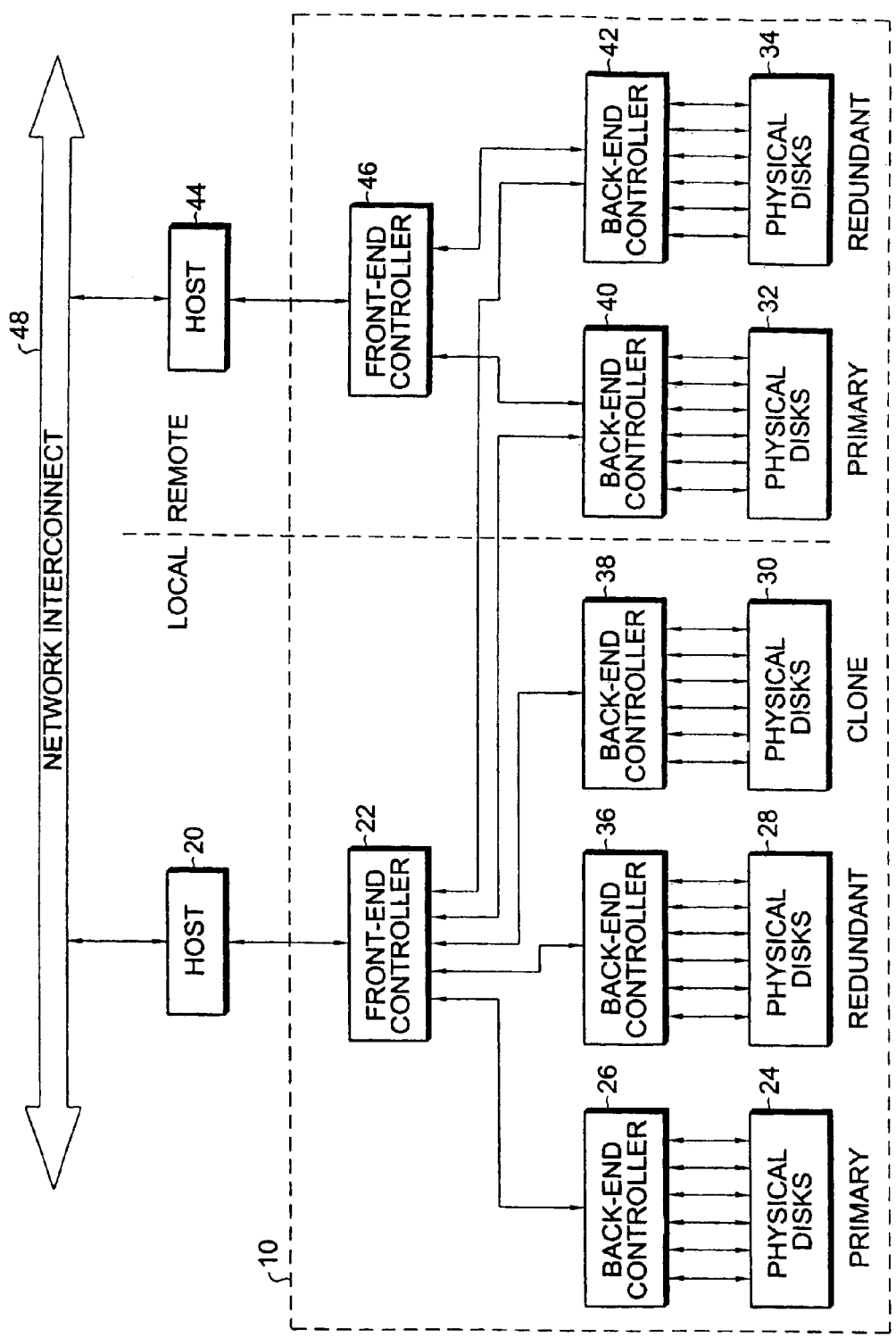
FIG. 2 is a block diagram illustrating the very large volume of FIGS. 1A and 1B.

The RAID-5 set PL1, for example, comprises six, 9.1 GB physical disks 12 distributed across six SCSI busses bus1-bus6 of a back-end controller (see FIG. 2). Similarly, the RAID-5 set PL11 comprises six, 9.1 GB physical disks 14 distributed across the six SCSI busses bus1-bus6. In addition, six, 9.1 GB spare physical disks 16 seamlessly replace any failing disks on any of the busses bus1-bus6 by rebuilding the data stored on failing disks from parity data, thereby restoring redundancy after a disk failure.

As described herein the very large volume 10 has a high degree of redundancy. If the bus3 physical disk 12 fails, for example, it is replaced by the bus3 spare disk 16 by using parity data to rebuild the data stored on the failing bus3 physical disk 12 onto the replacement bus3 spare disk 16. If bus3 itself fails, for example, the parity redundancy in the RAID-5 sets PL1-PL11 regenerates the data stored on the failing bus3. If the back-end controller (see FIG. 2) associated with the RAID-5 sets PL1-PL11 fails, for example, the redundant local storage copy, comprised of the RAID-5 sets RL1-RL11, provides redundancy. Finally, if the front-end controller (see FIG. 2) associated with the primary and redundant local storage copies and the cloning storage copy fails or is destroyed (e.g., due to a disaster), the primary remote storage copy, comprised of the RAID-5 sets PR1-PR11, and the redundant remote storage copy, comprised of the RAID-5 sets RR1-RR11, provide redundancy.

As shown in a block diagram in FIG. 2, the very large volume 10 is connected to a local host computer 20 that reads data from, and writes data to, the volume 10 via a local front-end controller 22 that acts as a mirroring and striping engine. In other words, the controller 22 forms the mirror sets M1-M11 (see FIGS. 1A and 1B) and then stripes them so as to present them to the local host computer 20 as the very large volume 10.

The primary local storage copy comprises physical disks 24 (which include disks 12, 14, and 16 of FIGS. 1A and 1B) connected to a back-end controller 26. The controller 26 acts as a RAID-5 engine by forming the disks 24 into the RAID-5 sets PL1-PL11 (see FIGS. 1A and 1B) and presenting the sets PL1-PL11 to the front-end controller 22 as members. Similarly, the redundant local storage, clone, primary remote storage, and redundant remote storage copies comprise physical disks 28, 30, 32, and 34, respectively, connected to back-end controllers 36, 38, 40, and 42, respectively, that act as RAID-5 engines by forming the disks 28, 30, 32, and 34 into the RAID-5 sets RL1-RL11, C1-C11, PR1-PR11, and RR1-RR11 and presenting these sets to front-end controller 22 as members.

In addition, the very large volume 10 is connected to a remote host computer 44 that reads data from, and writes data to, the volume 10 via a remote front-end controller 46 that acts as a mirroring and striping engine for the primary and redundant remote storage copies. The local and remote host computers 20 and 44 are connected via a network interconnect 48, such as the internet or a dedicated network line.

In an alternative embodiment, the front-end controller 22 can be configured to present a 273 GB unit and a 227.5 GB unit to the local host computer 20, rather than the single 500.5 GB unit described above. Of course, it should be understood that the front-end controller 22 can, in fact, be configured in a multitude of ways to group the mirror sets M1-11 into between one and eleven total units, each potentially ranging in size from 45.5 GB to 500.5 GB. Further, it should be understood that the front-end controller 22 can be configured (typically using software) to partition the striped mirror sets M1-11 into an infinite number and size of units.

In addition, it should be understood that although this invention has been described with reference to an embodiment having two levels of stacked controllers, the invention is not limited to the two levels described. Rather, the invention includes within its scope any number of levels of stacked controllers.

Although this invention has been described with reference to particular embodiments, the invention is not limited to these described embodiments. Rather, the invention is limited only by the appended claims, which include within their scope all equivalent devices and methods that operate according to the principles of the invention as described.

The invention claimed is:

1. An apparatus that provides a virtual storage volume, the apparatus comprising:
 a plurality of disks;
 a plurality of back-end controllers coupled to the plurality of disks, the plurality of back-end controllers forming the plurality of disks into redundant array of independent disks (RAID) sets that include a primary storage copy, a redundant storage copy, and a cloning storage copy; and a front-end controller coupled to the plurality of back-end controllers, the front-end controller forming mirror sets and striping the mirror sets to generate the virtual storage volume from the RAID sets.

2. The apparatus as recited in claim 1, wherein the RAID sets further include a primary remote storage copy and a redundant remote storage copy.

3. The apparatus as recited in claim 1, wherein the plurality of back-end controllers comprises a back-end controller for a primary local storage copy, a back-end controller for a redundant local storage copy, a back-end controller for a cloning storage copy, a back-end controller for a primary remote storage copy, and a back-end controller for a redundant remote storage copy.

4. The apparatus as recited in claim 1, wherein the plurality of back-end controllers present the RAID sets to the front-end controller as members, and the front-end controller generates the mirror sets from the RAID sets.

5. The apparatus as recited in claim 4, wherein the front-end controller stripes data across the mirror sets to generate the virtual storage volume.

6. The apparatus as recited in claim 4, wherein the plurality of back-end controllers comprises a back-end controller for a primary local storage copy, a back-end controller for a redundant local storage copy, and a back-end controller for a remote storage copy; and wherein at least one mirror set of the plurality of mirror sets includes at least three copies of data for the virtual storage volume.

7. A method of storing data on a plurality of disks, the method comprising:
    writing the data to a virtual volume;
    striping the data onto a plurality of mirror sets using a front-end controller, wherein the plurality of mirror sets together form the virtual volume;
    using first and second back-end controllers to organize the data across a plurality of redundant arrays of disks; and
    using the first and second back-end controllers to distribute the data across the plurality of redundant arrays of disks using the first back-end controller for a first copy and the second back-end controller for a second copy, wherein the plurality of redundant arrays of disks together form the plurality of mirror sets.

8. The method as recited in claim 7, wherein the writing comprises:
    writing the data to the virtual volume, the virtual volume including a redundant local storage copy as part of the plurality of mirror sets.

9. The method as recited in claim 7, wherein the writing comprises:
    writing the data to the virtual volume, the virtual volume including a remote storage copy as part of the plurality of mirror sets.

10. An apparatus that provides a virtual storage volume using at least two levels of stacked controllers; a back-end level that presents disks as a plurality of redundant arrays of disks, and a front-end level that presents the plurality of redundant arrays of disks as the virtual storage volume, wherein the front-end level comprises plural front-end controllers that stripe data for the virtual storage volume across a plurality of virtual sets that are organized from the plurality of redundant arrays of disks, and the back-end level comprises plural back-end controllers that form the plurality of redundant arrays of disks into redundant array of independent disks (RAID) sets and present the RAID sets to the plural front-end controllers.

11. The apparatus as recited in claim 10, wherein the RAID sets include a primary local storage copy, a redundant local storage copy, a local cloning storage copy, and a remote storage copy.

12. The apparatus as recited in claim 11, wherein the primary local storage copy is stored at a primary location to which data is written and from which the data is read, the redundant local storage copy provides mirror-type redundancy for the data, and the local cloning storage copy provides off-line data backups without interrupting read/write activities.

13. The apparatus as recited in claim 11, wherein the RAID sets further include a remote redundant storage copy, the remote storage copy and the redundant remote storage copy provide disaster tolerance in a RAID-5 set.

14. The apparatus as recited in claim 10, wherein the plurality of virtual sets comprises a plurality of virtual mirrored sets that are organized from the plurality of redundant arrays of disks; and wherein the back-end level comprises a plurality of back-end controllers that create a plurality of copies of the data, and wherein the front-end controller stripes the plurality of copies of the data across the plurality of virtual mirrored sets.

15. An electronic system comprising:
    a host; and
    an apparatus coupled to the host for presenting a virtual volume to the host, the apparatus including:
        a first back-end controller;
        a first plurality of disks that are formed and organized by the first back-end controller into a first plurality of redundant arrays of disks;
        a second back-end controller;
        a second plurality of disks that are formed and organized by the second back-end controller into a second plurality of redundant arrays of disks; and
        a front-end controller that generates the virtual volume by striping data copies of the first plurality of redundant arrays of disks and the second plurality of redundant arrays of disks onto a plurality of mirror sets.

16. The electronic system as recited in claim 15, further comprising:
    another host, the other host coupled to the host via a network interconnect;
    wherein the apparatus is coupled to the other host, the apparatus further including:
        a third, back-end controller;
        a third plurality of disks that are organized by the third back-end controller into a third plurality of redundant arrays of disks; and
        another front-end controller that provides separate access to the third plurality of redundant arrays of disks; and
        wherein the front-end controller generates the virtual volume by striping data copies of the first, second, and third plurality of redundant arrays of disks onto the plurality of mirror sets.

* * * * *

UNITED STATES PATENT AND TRADEMARK OFFICE
CERTIFICATE OF CORRECTION

| | |
|---|---|
| PATENT NO. | : 7,356,644 B2 |
| APPLICATION NO. | : 11/315606 |
| DATED | : April 8, 2008 |
| INVENTOR(S) | : Theodore E. Bruning, III et al. |

It is certified that error appears in the above-identified patent and that said Letters Patent is hereby corrected as shown below:

In column 1, lines 9-10, after "7,000,069" delete "Ser. No. 09/286,160".

In column 6, line 50, in Claim 16, after "a third" delete ",".

Signed and Sealed this

Twenty-ninth Day of July, 2008

JON W. DUDAS
*Director of the United States Patent and Trademark Office*